US012801374B2

(12) United States Patent
Wang et al.

(10) Patent No.: US 12,801,374 B2
(45) Date of Patent: Nov. 17, 2026

(54) NON-INDUCTIVE UPGRADE METHOD FOR INTERRUPT PROCESSING PROGRAM, AND COMPUTER SYSTEM

(71) Applicant: SUZHOU METABRAIN INTELLIGENT TECHNOLOGY CO., LTD., Suzhou (CN)

(72) Inventors: Xinglong Wang, Suzhou (CN); Yanming Su, Suzhou (CN); An Wu, Suzhou (CN); Jinfeng Li, Suzhou (CN); Baoyang Liu, Suzhou (CN); Huatang Ban, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/125,532

(22) PCT Filed: Jun. 18, 2024

(86) PCT No.: PCT/CN2024/099923
§ 371 (c)(1),
(2) Date: Apr. 29, 2025

(87) PCT Pub. No.: WO2025/066306
PCT Pub. Date: Apr. 3, 2025

(65) Prior Publication Data

US 2026/0010363 A1 Jan. 8, 2026

(30) Foreign Application Priority Data

Sep. 25, 2023 (CN) ........................ 202311243963.X

(51) Int. Cl.
*G06F 8/654* (2018.01)
*G06F 9/48* (2006.01)

(52) U.S. Cl.
CPC ............ *G06F 8/654* (2018.02); *G06F 9/4812* (2013.01)

(58) Field of Classification Search
None
See application file for complete search history.

(56) References Cited

U.S. PATENT DOCUMENTS

2016/0335005 A1* 11/2016 Dasari ..................... G06F 8/654
2020/0218527 A1* 7/2020 Ganesan .................. G06F 8/65
(Continued)

FOREIGN PATENT DOCUMENTS

CN 106155745 A * 11/2016 ............ G06F 8/654
CN 108037945 A 5/2018
(Continued)

OTHER PUBLICATIONS

Gedeon, "Secure boot and firmware update on a microcontroller-based embedded board", 2020, Budapest University of Technology and Economics (Year: 2020).*

*Primary Examiner* — Hossain M Morshed
(74) *Attorney, Agent, or Firm* — IPro, PLLC

(57) ABSTRACT

A method for seamless upgrade of an interrupt handling program includes responding, by a baseboard management controller (BMC), to an upgrade operation for an interrupt handling program to be upgraded, acquiring the interrupt handling program to be upgraded and upgrade parameters; storing, by the BMC, the interrupt handling program to be upgraded in basic input output system (BIOS) Flash, overwriting a historical interrupt handling program corresponding to the interrupt handling program to be upgraded in the BIOS Flash, and sending an upgrade interrupt signal to an interrupt handler; starting, by the interrupt handler, an interrupt upgrade program and acquiring the upgrade parameters, moving the interrupt handling program to be upgraded in the BIOS Flash to a physical memory address according to the (Continued)

upgrade parameters, and overwriting a historical interrupt handling program corresponding to the interrupt handling program to be upgraded to be regarded as a new interrupt handling program.

20 Claims, 1 Drawing Sheet

(56) References Cited

U.S. PATENT DOCUMENTS

| | | | | |
|---|---|---|---|---|
| 2020/0257521 | A1* | 8/2020 | Jayakumar | G06F 21/572 |
| 2021/0294763 | A1* | 9/2021 | Ladkani | G06F 13/24 |
| 2022/0198017 | A1* | 6/2022 | Fu | G06F 21/572 |
| 2023/0315284 | A1* | 10/2023 | Rao | G06F 3/0658 717/168 |
| 2026/0010363 | A1* | 1/2026 | Wang | G06F 8/654 |

FOREIGN PATENT DOCUMENTS

| | | | | |
|---|---|---|---|---|
| CN | 113127044 | A * | 7/2021 | G06F 8/654 |
| CN | 114064065 | A | 2/2022 | |
| CN | 114547620 | A | 5/2022 | |
| CN | 116578327 | A | 8/2023 | |
| CN | 117008941 | A * | 11/2023 | G06F 9/4812 |
| WO | 2021206756 | A1 | 10/2021 | |

* cited by examiner

NON-INDUCTIVE UPGRADE METHOD FOR INTERRUPT PROCESSING PROGRAM, AND COMPUTER SYSTEM

CROSS-REFERENCE TO RELATED APPLICATION

This application claims the priority of the Chinese Patent application filed on Sep. 25, 2023 before the CNIPA, China National Intellectual Property Administration with the application number of 202311243963.X, and the title of "METHOD FOR SEAMLESS UPGRADE OF INTERRUPT HANDLING PROGRAM AND COMPUTER SYSTEM", which is incorporated herein in its entirety by reference.

FIELD

The present application relates to the field of data processing and more particularly, to a method for seamless upgrade of an interrupt handling program and a computer system.

BACKGROUND

Interruption mechanism is one of the basic mechanisms in computer systems, which plays the role of a communication network in the system to coordinate the response and processing of the system for various external events. Interruption is a necessary condition for implementing multiprogramming design.

In the computer systems, processors often have advanced privilege interrupt mechanisms. BIOS (Basic Input Output System) and OS (Operator System) trigger advanced privilege interrupts to enter the privileged interrupt handling program. For example, when refreshing the firmware image of the BIOS under the OS, in order to ensure the security of the firmware image, the OS is unable to directly access the Flash memory of the BIOS. Therefore, the advanced privilege interrupt is triggered under the OS, and the interrupt handling program of this interrupt has the highest level of processor privileges. This privileged code is used to update the Flash memory of the BIOS. Advanced privilege interrupts may also be used for fault diagnosis at a processor level, such as accessing processor registers in the privileged code to analyze system faults.

However, the privilege code of an interrupt handling program itself may also have problems. Once the privilege code for handling advanced privilege functions encounters issues, the system may experience serious problems such as downtime. Currently, when modifying or upgrading the privilege code of the interrupt handling program, it is necessary to shut down and restart to enable the modified privilege code of the interrupt handling program to take effect.

SUMMARY

Embodiments of the present application provide a method for seamless upgrade of an interrupt handling program and a computer system, aiming to upgrade privilege codes of the interrupt handling program online.

In a first aspect, an embodiment of the present application provides a method for seamless upgrade of an interrupt handling program, which includes:

responding, by a baseboard management controller (BMC), to an upgrade operation for an interrupt handling program to be upgraded, and acquiring the interrupt handling program to be upgraded and upgrade parameters of the interrupt handling program to be upgraded, wherein the upgrade parameters include an interrupt number and a code length;

storing, by the BMC, the interrupt handling program to be upgraded in basic input output system (BIOS) Flash according to the upgrade parameters, overwriting a historical interrupt handling program corresponding to the interrupt handling program to be upgraded in the BIOS Flash, and sending an upgrade interrupt signal to an interrupt handler;

responding, by the interrupt handler, to the upgrade interrupt signal, and starting an interrupt upgrade program; and acquiring, by the interrupt upgrade program, the upgrade parameters of the interrupt handling program to be upgraded, moving the interrupt handling program to be upgraded in the BIOS Flash to a physical memory address according to the upgrade parameters, and overwriting a historical interrupt handling program corresponding to the interrupt handling program to be upgraded in the physical memory address to be regarded as a new interrupt handling program.

In some embodiments, after responding, by the baseboard management controller (BMC), to the upgrade operation for the interrupt handling program to be upgraded, the method further includes:

starting, by the BMC, a BMC upgrade program stored in the BMC;

wherein storing, by the BMC, the interrupt handling program to be upgraded in the basic input output system (BIOS) Flash according to the upgrade parameters, overwriting the historical interrupt handling program corresponding to the interrupt handling program to be upgraded, and sending the upgrade interrupt signal to the interrupt handler includes:

storing, by the BMC upgrade program, the interrupt handling program to be upgraded in the BIOS Flash according to the upgrade parameters, and overwriting the historical interrupt handling program corresponding to the interrupt handling program to be upgraded; and sending, by the BMC upgrade program, the upgrade interrupt signal to the interrupt handler, wherein the upgrade interrupt signal carries the interrupt number corresponding to the interrupt upgrade program.

In some embodiments, storing, by the BMC upgrade program, the interrupt handling program to be upgraded in the BIOS Flash according to the upgrade parameters, and overwriting the historical interrupt handling program corresponding to the interrupt handling program to be upgraded includes:

reading, by the BMC upgrade program, the interrupt handling program to be upgraded stored in the BMC according to the code length in the upgrade parameters; and determining, by the BMC upgrade program, a target storage location in the BIOS Flash corresponding to the interrupt handling program to be upgraded according to the interrupt number in the upgrade parameters, storing the interrupt handling program to be upgraded at the corresponding target storage location in the BIOS Flash, and overwriting the historical interrupt handling program stored at the target storage location with the interrupt handling program to be upgraded.

In some embodiments, responding, by the interrupt handler, to the upgrade interrupt signal, and starting an interrupt upgrade program includes:

acquiring, by the interrupt handler, the interrupt upgrade program from the physical memory address and starting the interrupt upgrade program according to the interrupt number corresponding to the interrupt upgrade program carried in the upgrade interrupt signal.

In some embodiments, further including:

sending, by the BMC, the upgrade parameters of the interrupt handling program to be upgraded to a central processing unit (CPU) register for storage through a data transmission channel with a CPU.

In some embodiments, acquiring, by the interrupt upgrade program, the upgrade parameters of the interrupt handling program to be upgraded includes:

reading, by the interrupt upgrade program, the CPU register, and acquiring the upgrade parameters of the interrupt handling program to be upgraded.

In some embodiments, sending, by the BMC, the upgrade parameters of the interrupt handling program to be upgraded to the central processing unit (CPU) register for storage through the data transmission channel with the CPU includes:

sending, by the BMC, the upgrade parameters of the interrupt handling program to be upgraded to CPU register for storage through a platform environment control interface (PECI) channel of an Intel platform.

In some embodiments, sending, by the BMC, the upgrade parameters of the interrupt handling program to be upgraded to the central processing unit (CPU) register for storage through the data transmission channel with the CPU includes:

sending, by the BMC, the upgrade parameters of the interrupt handling program to be upgraded to CPU register for storage through a universal standard peripheral component interconnect express (PCIe) channel.

In some embodiments, acquiring the interrupt handling program to be upgraded and upgrade parameters of the interrupt handling program to be upgraded includes:

when the upgrade parameters of the interrupt handling program to be upgraded are stored in a file header of the interrupt handling program to be upgraded, acquiring, by the BMC, the file header of a file of the interrupt handling program to be upgraded, and parsing to obtain the upgrade parameters of the interrupt handling program to be upgraded.

In some embodiments, acquiring, by the interrupt upgrade program, the upgrade parameters of the interrupt handling program to be upgraded includes:

identifying, by the interrupt upgrade program, the file header of the interrupt handling program to be upgraded in the BIOS Flash, and parsing to obtain the upgrade parameters of the interrupt handling program to be upgraded.

In some embodiments, after identifying, by the interrupt upgrade program, the file header of the interrupt handling program to be upgraded in the BIOS Flash, and parsing to obtain the upgrade parameters of the interrupt handling program to be upgraded, the method further includes:

erasing, by the interrupt upgrade program, the file header of the interrupt handling program to be upgraded.

In some embodiments, further including:

when the BMC responds to the upgrade operation for the interrupt handling program to be upgraded, detecting whether the interrupt handling program to be upgraded includes the file header; and when the interrupt handling program to be upgraded includes the file header, carrying an upgrade identification for the file header;

wherein identifying, by the interrupt upgrade program, the file header of the interrupt handling program to be upgraded in the BIOS Flash, and parsing to obtain the upgrade parameters of the interrupt handling program to be upgraded includes:

searching, by the interrupt upgrade program, for the upgrade identification, determining the file header of the interrupt handling program to be upgraded corresponding to the upgrade identification, and parsing to obtain the upgrade parameters of the interrupt handling program to be upgraded.

In some embodiments, when the interrupt handling program to be upgraded includes the file header, carrying the upgrade identification for the file header includes:

performing a hash calculation on the upgrade parameters of the interrupt handling program to be upgraded, and adding a calculated hash value of the upgrade parameters as the upgrade identification to the file header of the interrupt handling program to be upgraded.

In some embodiments, acquiring, by the interrupt upgrade program, the upgrade parameters of the interrupt handling program to be upgraded, moving the interrupt handling program to be upgraded in the BIOS Flash to a physical memory address according to the upgrade parameters, and overwriting a historical interrupt handling program corresponding to the interrupt handling program to be upgraded in the physical memory address includes:

determining, by the interrupt upgrade program, a storage location of the interrupt handling program to be upgraded in the BIOS Flash according to the interrupt number of the interrupt handling program to be upgraded, and reading the interrupt handling program to be upgraded according to the code length of the interrupt handling program to be upgraded; and determining, by the interrupt upgrade program, a location in the physical memory address where the historical interrupt handling program corresponding to the interrupt handling program to be upgraded is stored according to the interrupt number, and overwriting the historical interrupt handling program with the interrupt handling program to be upgraded.

In some embodiments, further including:

configuring the upgrade interrupt signal corresponding to interrupt upgrade program as the highest priority.

In some embodiments, after responding, by the baseboard management controller (BMC), to the upgrade operation for the interrupt handling program to be upgraded, and acquiring the interrupt handling program to be upgraded and the upgrade parameters of the interrupt handling program to be upgraded, the method further includes:

when the BMC receives a plurality of different interrupt handling programs to be upgraded, assigning upgrade priorities to the plurality of different interrupt handling programs to be upgraded according to interrupt types of the interrupt handling programs to be upgraded;

wherein responding, by the interrupt handler, to the upgrade interrupt signal, and starting the interrupt upgrade program includes:

upgrading, by the interrupt upgrade program, the plurality of different interrupt handling programs to be upgraded in order of priority.

In some embodiments, after overwriting the historical interrupt handling program corresponding to the interrupt handling program to be upgraded in the physical memory address to be regarded as the new interrupt handling program, the method further includes:

when the interrupt handler monitors an interrupt signal corresponding to the new interrupt handling program, executing the new interrupt handling program.

In some embodiments, further including:

generating an upgrade completion prompt after regarding the interrupt handling program to be upgraded as the new interrupt handling program.

In some embodiments, further including:

monitoring an upgrade process of the interrupt handling program to be upgraded, and generating an upgrade failed prompt when upgrade of the interrupt handling program to be upgraded fails.

In a second aspect, an embodiment of the present application provides a computer system, wherein the computer system includes the BMC, the BIOS Flash, the interrupt handler and the physical memory address, the computer is used to execute the method for seamless upgrade of the interrupt handling program according to the first aspect.

Beneficial Effects

When an interrupt handler needs to be upgraded, the BMC responds to the upgrade operation for the interrupt handling program to be upgraded, and acquires the interrupt handling program to be upgraded and the upgrade parameters of the interrupt handling program to be upgraded, among them, the upgrade parameters include the interrupt number and the code length. Then, the BMC stores the interrupt handling program to be upgraded in the BIOS Flash according to the upgrade parameters, overwrites the historical interrupt handling program corresponding to the interrupt handling program to be upgraded in the BIOS Flash, and sends the upgrade interrupt signal to the interrupt handler. Then, the interrupt handler responds to the upgrade interrupt signal and starts the interrupt upgrade program. The interrupt upgrade program acquires the upgrade parameters of the interrupt handling program to be upgraded, moves the interrupt handling program to be upgraded in the BIOS Flash to the physical memory address according to the upgrade parameters, and overwrites the historical interrupt handling program corresponding to the interrupt handling program to be upgraded in the physical memory address to be regarded as the new interrupt handling program.

The present application provides the method for seamless upgrade of the interrupt handling program, which may upgrade the interrupt handling program online. The interrupt handling program to be upgraded located in the physical memory address takes effect immediately, without the need for shutdown and restart operations.

BRIEF DESCRIPTION OF THE DRAWINGS

In order to more clearly illustrate the technical solution of the embodiments of the present application, a brief introduction will be given to the accompanying drawings required for the description of the embodiments of the present application. It is obvious that the accompanying drawings described below are only some embodiments of the present application. For those skilled in the art, other drawings may be obtained based on these drawings without creative work.

DETAILED DESCRIPTION

Below, the technical solutions in the embodiments of the present application will be clearly and completely described in conjunction with the accompanying drawings in the embodiments of the present application. Obviously, the described embodiments are a part of the embodiments of the present application, not all of them. Based on the embodiments in the present application, all other embodiments obtained by persons skilled in the art without creative work are within the scope of protection of the present application.

Figure 1:
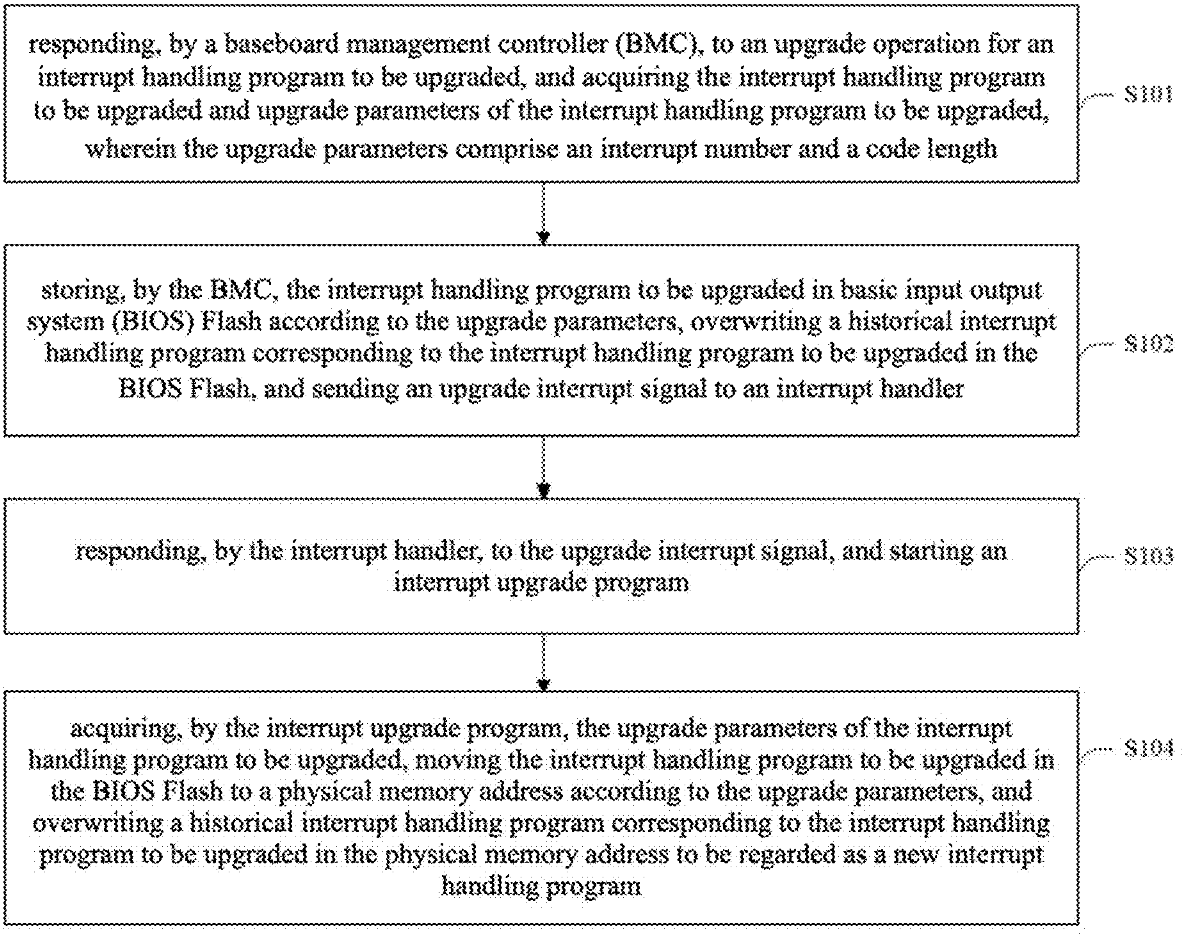
FIG. 1 is a flowchart of steps of a method for seamless upgrade of an interrupt handling program according to some embodiments of the present application.

Referring to FIG. 1, a flowchart of a method for seamless upgrade of an interrupt handling program in an embodiment of the present application is shown. The method may specifically include the following steps:

S101: responding, by a baseboard management controller (BMC), to an upgrade operation for an interrupt handling program to be upgraded, and acquiring the interrupt handling program to be upgraded and upgrade parameters of the interrupt handling program to be upgraded, wherein the upgrade parameters include an interrupt number and a code length.

When a user needs to upgrade any interrupt handling program, they upload the program code of the interrupt handling program to be upgraded and the upgrade parameters of the interrupt handling program to be upgraded to the BMC. The upgrade parameters include the interrupt number and the code length of the interrupt handling program to be upgraded.

The interrupt number of the interrupt handling program corresponds one-to-one with the storage location of the interrupt handling program in the BIOS Flash and the physical memory address. The interrupt handling program to be upgraded is an upgrade to the historical interrupt handling program, but the historical interrupt handling program is stored in the BIOS Flash. Therefore, the BIOS has determined the interrupt number corresponding to the historical interrupt handling program, and the interrupt number of the interrupt handling program to be upgraded is consistent with that of the historical interrupt handling program corresponding to the interrupt handling program to be upgraded.

In the actual implementation process, the BMC may provide a communication interface for users to upload the interrupt handling program to be upgraded to perform the upgrade operation for the interrupt handling program to be upgraded.

In some embodiments, the users are allowed to upload the program code of the interrupt handling program to be upgraded and the upgrade parameters of the interrupt handling program to be upgraded through the communication interface, respectively. The BMC may directly obtain the interrupt handling program to be upgraded and the upgrade parameters.

In some other embodiments, the users are also allowed not to upload the upgrade parameters of the interrupt handling program to be upgraded separately, but to add a recognizable file header to the program file of the interrupt handling program to be upgraded, and add the upgrade parameters of the interrupt handling program to be upgraded to the recognizable file header.

When the BMC responds to the upgrade operation for the interrupt handling program to be upgraded, if the BMC does not directly obtain the upgrade parameters of the interrupt handling program to be upgraded, the BMC may obtain the file header of the file of the interrupt handling program to be upgraded and parse it to obtain the upgrade parameters of the interrupt handling program to be upgraded.

S102: storing, by the BMC, the interrupt handling program to be upgraded in basic input output system (BIOS) Flash according to the upgrade parameters, overwriting a historical interrupt handling program corresponding to the interrupt handling program to be upgraded in the BIOS Flash, and sending an upgrade interrupt signal to an interrupt handler.

The BIOS Flash stores all the interrupt handling programs in the OS. Due to the non-transitory storage characteristic of the BIOS Flash, the data saved during power failure of the system will not be lost. When the system is powered on, the interrupt handling programs stored in the BIOS Flash are automatically copied to the physical memory address. When the interrupt handler detects the interrupt signal corresponding to any interrupt handling program, it calls and executes the interrupt handling program in the physical memory address.

Therefore, it is necessary to first save the interrupt handling program to be upgraded in the BIOS Flash, so that the upgraded interrupt handling program may still be obtained at the next system startup. In some embodiments, the BMC reads the interrupt handling program to be upgraded stored in the BMC according to the code length in the upgrade parameters, and then determines the target storage location corresponding to the interrupt handling program to be upgraded in the BIOS Flash according to the interrupt number in the upgrade parameters. The interrupt handling program to be upgraded is then stored to the corresponding target storage location in the BIOS Flash, and the historical interrupt handling program stored in the target storage location is overwritten with the interrupt handling program to be upgraded, so that there is only the upgraded interrupt handling program in the BIOS Flash, and the historical interrupt handling program has been overwritten with data.

After storing the interrupt handling program to be upgraded in the BIOS Flash, if the interrupt handling program to be upgraded is still not effective in a working state of the current system, the BMC also needs to send the upgrade interrupt signal to the interrupt handler, triggering the interrupt upgrade program to make the interrupt handling program to be upgraded effective in the working state of the current system.

In some embodiments, in order to improve the efficiency of interrupt upgrade, a thread is written in the BMC to handle interrupt upgrade tasks, such as adding BMC upgrade programs in the BMC.

When the BMC responds to the upgrade operation for the interrupt handling program to be upgraded, it starts the BMC upgrade program stored in the BMC while obtaining the interrupt handling program to be upgraded and the upgrade parameters.

Then, the BMC upgrade program reads the interrupt handling program to be upgraded stored in the BMC according to the code length in the upgrade parameters, and determines the target storage location corresponding to the interrupt handling program to be upgraded in the BIOS Flash according to the interrupt number in the upgrade parameters. The interrupt handling program to be upgraded is then stored to the corresponding target storage location in the BIOS Flash, and the historical interrupt handling program stored in the target storage location is overwritten with the interrupt handling program to be upgraded.

Next, the BMC upgrade program sends the upgrade interrupt signal to the interrupt handler, and the upgrade interrupt signal carries the interrupt number corresponding to the interrupt upgrade program.

The interrupt upgrade program is essentially an interrupt handling program. The interrupt upgrade program may be pre stored and stably saved in the BIOS Flash. Every time the system is powered on, the interrupt upgrade program is automatically copied to the physical memory address. Therefore, the interrupt upgrade program also has corresponding interrupt number, the interrupt number corresponding to the interrupt upgrade program corresponds one-to-one with the storage location of the interrupt upgrade program in the BIOS Flash and physical memory address.

S103: responding, by the interrupt handler, to the upgrade interrupt signal, and starting an interrupt upgrade program.

In some embodiments, the interrupt handler starts the interrupt upgrade program at the storage location corresponding to the interrupt upgrade program in the physical memory address according to the interrupt number corresponding to the interrupt upgrade program carried in the upgrade interrupt signal.

In some embodiments, considering that the interrupt mechanism is one of the most important basic mechanisms in the computer systems, coordinating the response and processing of the system for various external events, if the timeliness requirements for upgrading the interrupt handling program are high, and if the upgrade process of the interrupt handling program takes a long time, it will affect the response of the system to normal interrupt signals, leading to system crashes and other problems. Therefore, the upgrade interrupt signal corresponding to the interrupt upgrade program may be configured as the highest priority. When the interrupt handler receives the upgrade interrupt signal corresponding to the interrupt upgrade program, it will prioritize processing the upgrade interrupt signal, thereby reducing the duration of upgrading the interrupt handling program.

S104: acquiring, by the interrupt upgrade program, the upgrade parameters of the interrupt handling program to be upgraded, moving the interrupt handling program to be upgraded in the BIOS Flash to a physical memory address according to the upgrade parameters, and overwriting a historical interrupt handling program corresponding to the interrupt handling program to be upgraded in the physical memory address to be regarded as a new interrupt handling program.

Although the interrupt handling program stored in the BIOS Flash will not be lost due to power failure of the system, the interrupt handling program is unable to be called or started directly in the BIOS Flash without interrupting the processor. Therefore, the interrupt handling program needs to be stored in the physical memory address to be enabled under the current working state of the system. Therefore, after starting the interrupt upgrade program, the interrupt upgrade program is responsible for moving the interrupt handling program to be upgraded stored in the BIOS Flash to the physical memory address.

In some embodiments, after starting the interrupt upgrade program, the interrupt upgrade program first needs to obtain the upgrade parameters of the interrupt handling program to be upgraded, and then may obtain the interrupt handling program to be upgraded according to the interrupt number and the code length in the upgrade parameters.

In some embodiments, the BMC may participate in the parameter transmission process of the upgrade parameters. In some embodiments, the BMC upgrade program sends the upgrade parameters of the interrupt handling program to be upgraded to a central processing unit (CPU) register for storage through a data transmission channel with a CPU.

The data transmission channel between the BMC and the CPU may be specifically designed according to the type of the CPU, for example, the BMC sends the upgrade parameters of the interrupt handling program to be upgraded to the CPU register for storage through the PECI channel of the Intel platform, or the BMC sends the upgrade parameters of the interrupt handling program to be upgraded to the CPU register for storage through the universal standard PCIe channel.

When the interrupt upgrade program needs to obtain the upgrade parameters of the interrupt handling program to be upgraded, the interrupt upgrade program reads the CPU register and obtains the upgrade parameters of the interrupt handling program to be upgraded.

In some other embodiments, the BMC does not participate in the parameter transmission process of the upgrade parameters. In some embodiments, when the user does not upload the upgrade parameters of the interrupt handling program to be upgraded separately, but to add a recognizable file header to the program file of the interrupt handling program to be upgraded, and add the upgrade parameters of the interrupt handling program to be upgraded to the recognizable file header, the interrupt handling program to be upgraded stored in the BIOS Flash still carries the recognizable file header.

When the interrupt upgrade program needs to obtain the upgrade parameters of the interrupt handling program to be upgraded, the interrupt upgrade program identifies the file header of the interrupt handling program to be upgraded in the BIOS Flash and parses it to obtain the upgrade parameters of the interrupt handling program to be upgraded.

Furthermore, in order to avoid the interrupt upgrade program repeatedly upgrading the same interrupt handling program to be upgraded, after the interrupt upgrade program parses and obtains the upgrade parameters of the interrupt handling program to be upgraded, the interrupt upgrade program erases the file header of the interrupt handling program to be upgraded stored in the BIOS Flash.

In some other embodiments, in order to quickly locate the interrupt upgrade programs in the BIOS Flash to the file header of the interrupt handling program to be upgraded, the BMC may detect whether the interrupt handling program to be upgraded includes a file header in response to the upgrade operation for the interrupt handling program to be upgraded. In the case where the interrupt handling program to be upgraded includes the file header, an upgrade identification may be carried for the file header. For example, the upgrade parameters of the interrupt handling program to be upgraded may be hashed, and the calculated hash value of the upgrade parameters may be added as the upgrade identification to the file header of the interrupt handling program to be upgraded.

When the interrupt upgrade program identifies the file header of the interrupt handling program to be upgraded in the BIOS Flash, the interrupt upgrade program searches for the upgrade identification, determines the file header of the interrupt handling program to be upgraded corresponding to the upgrade identification, and parses to obtain the upgrade parameters of the interrupt handling program to be upgraded to further improve the efficiency of the upgrade process of the interrupt handling program.

After obtaining the upgrade parameters of the interrupt handling program to be upgraded, the interrupt upgrade program determines the storage location of the interrupt handling program to be upgraded in the BIOS Flash according to the interrupt number of the interrupt handling program to be upgraded, and reads the interrupt handling program to be upgraded according to the code length of the interrupt handling program to be upgraded. The interrupt upgrade program determines the location in the physical memory address where the historical interrupt handling program corresponding to the interrupt handling program to be upgraded is stored according to the interrupt number. The historical interrupt handling program is overwritten with the interrupt handling program to be upgraded, and the interrupt handling program is exited. At this time, the interrupt handling program to be upgraded may be used as a new interrupt handling program, which may be started in response to the interrupt signal corresponding to the current working state of the system. In some embodiments, when the interrupt handler detects the interrupt signal corresponding to the new interrupt handling program, it executes the new interrupt handling program.

The present application provides a method for seamless upgrade of the interrupt handling program, which may upgrade the interrupt handling program online. The interrupt handling program to be upgraded located in the physical memory address takes effect immediately, without the need for shutdown and restart operations, thereby improving the efficiency for upgrading the interrupt handling program.

In some embodiments, when the BMC receives a plurality of different interrupt handling programs to be upgraded, assigning upgrade priorities to the plurality of different interrupt handling programs to be upgraded according to interrupt types of the interrupt handling programs to be upgraded; when the interrupt handler responds to the upgrade interrupt signal and starts the interrupt upgrade program, the interrupt upgrade program upgrades the plurality of different interrupt handling programs to be upgraded in order of priority. For example, the upgrade priorities assigned to the plurality of different interrupt handling programs to be upgraded may be determined based on degree of impact of corresponding interrupt handling programs on the basic operation of the system, which may be customized by the users. By assigning the upgrade priorities to the plurality of different interrupt handling programs to be upgraded, the interrupt upgrade program upgrades the plurality of different interrupt handling programs to be upgraded in order of the priorities, which may execute the upgrade process of the interrupt handling programs more reasonably.

In some other embodiments, an upgrade completion prompt may be generated after the interrupt handling program to be upgraded is regarded as the new interrupt handling program. Alternatively, the upgrade process of the interrupt handling program to be upgraded is monitored, and when the upgrade of the interrupt handling program to be upgraded fails, an upgrade failure prompt may be generated to notify the user in a timely manner. The user may make a fault recovery response in a timely manner based on the upgrade failure prompt of the interrupt handling program to be upgraded.

In some embodiments, the execution method of the method for seamless upgrade of the interrupt handling program is as follows:

Based on one communication interface provided by the BMC for the users to upload the interrupt handling program to be upgraded. The users upload the program code of the interrupt handling program to be upgraded and the upgrade parameters of the interrupt handling program to be upgraded respectively. The BMC responds to the upgrade operation for the interrupt handling program to be upgraded to obtain the interrupt handling program to be upgraded and the upgrade parameters. The BMC stores the interrupt handling program to be upgraded in the BMC and starts the BMC upgrade program stored in the BMC.

The BMC upgrade program reads the interrupt handling program to be upgraded stored in the BMC based on the code length in the upgrade parameters, and determines the target storage location corresponding to the interrupt handling program to be upgraded in the BIOS Flash according to the interrupt number in the upgrade parameters. The interrupt handling program to be upgraded is then stored to the corresponding target storage location in the BIOS Flash, and the historical interrupt handling program stored in the target storage location is overwritten with the interrupt handling program to be upgraded.

Next, the BMC upgrade program sends the upgrade parameters of the interrupt handling program to be upgraded to the CPU register for storage through the data transmission channel with the CPU. At the same time, the BMC upgrade program sends the upgrade interrupt signal to the interrupt handler, and the upgrade interrupt signal carries the interrupt number corresponding to the interrupt upgrade program.

The interrupt handler responds to the upgrade interrupt signal with the highest priority, and according to the interrupt number corresponding to the interrupt upgrade program carried in the upgrade interrupt signal, starts the interrupt upgrade program at the storage location corresponding to the interrupt upgrade program in the physical memory address.

The interrupt upgrade program reads the CPU register to obtain the upgrade parameters of the interrupt handling program to be upgraded.

After obtaining the upgrade parameters of the interrupt handling program to be upgraded, the interrupt upgrade program determines the storage location of the interrupt handling program to be upgraded in the BIOS Flash according to the interrupt number of the interrupt handling program to be upgraded, and reads the interrupt handling program to be upgraded according to the code length of the interrupt handling program to be upgraded. The interrupt upgrade program determines the location in the physical memory address where the historical interrupt handling program corresponding to the interrupt handling program to be upgraded is stored according to the interrupt number. The interrupt handling program to be upgraded is used to overwrite the historical interrupt handling program, and the interrupt handling program is exited. The interrupt handling program to be upgraded is used as the new interrupt handling program, and the upgrade completion prompt is generated.

Afterwards, when the interrupt signal corresponding to the new interrupt handling program is detected, the new interrupt handling program is executed.

In some other embodiments, the execution method of the method for seamless upgrade of the interrupt handling program is as follows:

Based on one communication interface provided by the BMC for the users to upload the interrupt handling program to be upgraded. The users do not upload the upgrade parameters of the interrupt handling program to be upgraded separately, but to add a recognizable file header to the program file of the interrupt handling program to be upgraded, and add the upgrade parameters of the interrupt handling program to be upgraded to the recognizable file header.

When the BMC responds to the upgrade operation for the interrupt handling program to be upgraded, the BMC may obtain the file header of the file of the interrupt handling program to be upgraded and parse to obtain the upgrade parameters of the interrupt handling program to be upgraded. And the BMC performs the hash calculation on the upgrade parameters of the interrupt handling program to be upgraded to obtain the hash value of the upgrade parameters, and adds the calculated hash value of the upgrade parameters as the upgrade identification to the file header of the interrupt handling program to be upgraded.

The BMC upgrade program reads the interrupt handling program to be upgraded stored in the BMC based on the code length in the upgrade parameters, and determines the target storage location corresponding to the interrupt handling program to be upgraded in the BIOS Flash according to the interrupt number in the upgrade parameters. The interrupt handling program to be upgraded is then stored to the corresponding target storage location in the BIOS Flash, and the historical interrupt handling program stored in the target storage location is overwritten with the interrupt handling program to be upgraded.

Next, the BMC upgrade program sends the upgrade interrupt signal to the interrupt handler, and the upgrade interrupt signal carries the interrupt number corresponding to the interrupt upgrade program. The interrupt handler responds to the upgrade interrupt signal with the highest priority, and according to the interrupt number corresponding to the interrupt upgrade program carried in the upgrade interrupt signal, starts the interrupt upgrade program at the storage location corresponding to the interrupt upgrade program in the physical memory address.

The interrupt upgrade program searches for the upgrade identification in the BIOS Flash, further determines the file header of the interrupt handling program to be upgraded corresponding to the upgrade identification, and parses to obtain the upgrade parameters of the interrupt handling program to be upgraded.

After the interrupt upgrade program parses to obtain the upgrade parameters of the interrupt handling program to be upgraded, the interrupt upgrade program erases the file header of the interrupt handling program to be upgraded stored in the BIOS Flash to avoid the interrupt upgrade program repeatedly upgrading the same interrupt handling program to be upgraded.

After obtaining the upgrade parameters of the interrupt handling program to be upgraded, the interrupt upgrade program determines the storage location of the interrupt handling program to be upgraded in the BIOS Flash according to the interrupt number of the interrupt handling program to be upgraded, and reads the interrupt handling program to be upgraded according to the code length of the interrupt handling program to be upgraded. The interrupt upgrade program determines the location in the physical memory address where the historical interrupt handling program corresponding to the interrupt handling program to be upgraded is stored according to the interrupt number. The interrupt handling program to be upgraded is used to overwrite the historical interrupt handling program, and the interrupt handling program is exited. The interrupt handling program to be upgraded is used as the new interrupt handling program, and the upgrade completion prompt is generated.

Afterwards, when the interrupt signal corresponding to the new interrupt handling program is detected, the new interrupt handling program is executed.

In some other embodiments, the execution method of the method for seamless upgrade of the interrupt handling program is as follows:

Based on one communication interface is provided by the BMC for the users to upload the interrupt handling program to be upgraded. The users upload the program code of the interrupt handling program to be upgraded and the upgrade parameters of the interrupt handling program to be upgraded, respectively, and continuously upload two different interrupt handling programs to be upgraded.

The BMC responds to the upgrade operation for the interrupt handling programs to be upgraded, respectively obtains the first interrupt handling program to be upgraded and its corresponding upgrade parameters, as well as the second interrupt handling program to be upgraded and its corresponding upgrade parameters. The BMC stores the interrupt handling program to be upgraded in the BMC.

The BMC determines the upgrade priorities of the first interrupt handling program to be upgraded and the second interrupt handling program to be upgraded based on the corresponding relationship between the degree of the impact of the preset interrupt handling program on the basic operation of the system and the upgrade priorities of the interrupt handling programs to be upgraded.

The BMC starts the BMC upgrade program stored in the BMC.

The BMC upgrade program reads the upgrade parameters of the first interrupt handling program to be upgraded stored in the BMC based on the code length in the upgrade parameters of the first interrupt handling program to be upgraded, and determines the target storage location corresponding to the first interrupt handling program to be upgraded in the BIOS Flash according to the interrupt number of the first interrupt handling program to be upgraded. It then stores the first interrupt handling program to be upgraded carrying the upgrade priority to the corresponding target storage location in the BIOS Flash, and overwrites the corresponding historical interrupt handling program stored in the target storage location with the first interrupt handling program to be upgraded.

The BMC upgrade program reads the upgrade parameters of the second interrupt handling program to be upgraded stored in the BMC based on the code length in the upgrade parameters of the second interrupt handling program to be upgraded, and determines the target storage location corresponding to the second interrupt handling program to be upgraded in the BIOS Flash according to the interrupt number of the second interrupt handling program to be upgraded. It then stores the second interrupt handling program to be upgraded carrying the upgrade priority to the corresponding target storage location in the BIOS Flash, and overwrites the corresponding historical interrupt handling program stored in the target storage location with the second interrupt handling program to be upgraded.

Next, the BMC upgrade program sends the upgrade parameters and the upgrade priority of the first interrupt handling program to be upgraded, as well as the upgrade parameters and the upgrade priority of the second interrupt handling program to be upgraded, to the CPU register for storage through the data transmission channel with the CPU. At the same time, the BMC upgrade program sends the upgrade interrupt signal to the interrupt handler, and the upgrade interrupt signal carries the interrupt number corresponding to the interrupt upgrade program.

The interrupt handler responds to the upgrade interrupt signal with the highest priority, and according to the interrupt number corresponding to the interrupt upgrade program carried in the upgrade interrupt signal, starts the interrupt upgrade program at the storage location corresponding to the interrupt upgrade program in the physical memory address.

The interrupt upgrade program reads the CPU register to obtain the upgrade parameters and the upgrade priority of the first interrupt handling program to be upgraded, as well as the upgrade parameters and the upgrade priority of the second interrupt handling program to be upgraded. The upgrade parameters of both interrupt handling programs to be upgraded are stored in the pending queue of the interrupt upgrade program.

The interrupt upgrade program compares the upgrade priorities of the first interrupt handling program to be upgraded and the second interrupt handling program to be upgraded. For example, it is assumed that the upgrade priority of the first interrupt handling program to be upgraded is higher than that of the second interrupt handling program to be upgraded.

The interrupt upgrade program first determines the storage location of the first interrupt handling program to be upgraded in the BIOS Flash based on the interrupt number of the first interrupt handling program to be upgraded with higher upgrade priority, and reads the first interrupt handling program to be upgraded based on the code length of the first interrupt handling program to be upgraded. The interrupt upgrade program determines the location in the physical memory address where the historical interrupt handling program corresponding to the first interrupt handling program to be upgraded is stored based on the interrupt number of the first interrupt handling program to be upgraded. The first interrupt handling program to be upgraded is used to overwrite the historical interrupt handling program, and the first interrupt handling program to be upgraded is used as the new interrupt handling program, a prompt indicating that the upgrade of the first interrupt handling program to be upgraded is completed is generated.

Next, the interrupt upgrade program reads the upgrade parameters of the second interrupt handling program to be upgraded from the pending queue, determines the storage location of the second interrupt handling program to be upgraded in the BIOS Flash based on the interrupt number of the second interrupt handling program to be upgraded, and reads the second interrupt handling program to be upgraded based on the code length of the second interrupt handling program to be upgraded. The interrupt upgrade program determines the location in the physical memory address where the historical interrupt handling program corresponding to the second interrupt handling program to be upgraded is stored based on the interrupt number of the second interrupt handling program to be upgraded. The second interrupt handling program to be upgraded is used to overwrite the historical interrupt handling program, and the second interrupt handling program to be upgraded is used as the new interrupt handling program, a prompt indicating that the upgrade of the second interrupt handling program to be upgraded is completed is generated.

Afterwards, when monitoring the interrupt signal corresponding to any new interrupt handling program, the new interrupt handling program is executed.

Figure 2:
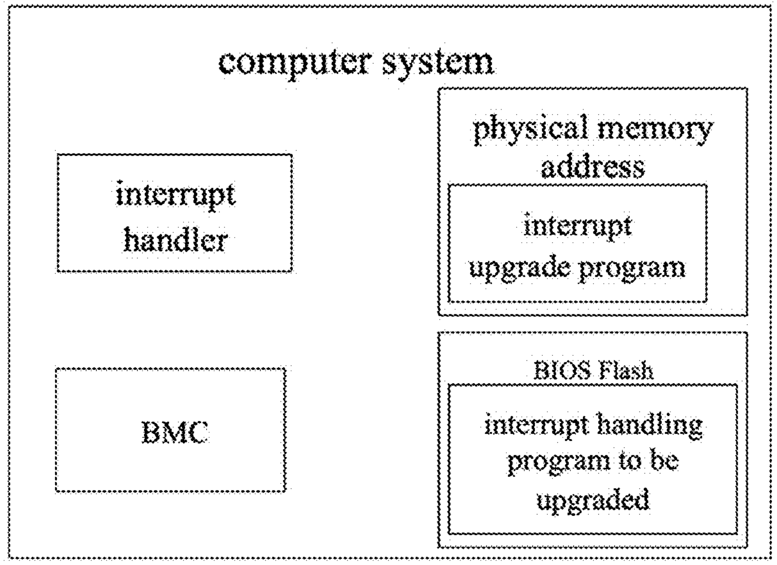
FIG. 2 is a schematic diagram of a computer system according to some embodiments of the present application.

Referring to FIG. 2, a schematic diagram of a computer system according to an embodiment of the present application is shown. The computer system includes the BMC, the BIOS Flash, the interrupt handler and the physical memory address, the computer is used to execute the method for seamless upgrade of the interrupt handling program as described in the embodiments.

In some embodiments, the BMC responds to the upgrade operation for the interrupt handling program to be upgraded, and acquires the interrupt handling program to be upgraded and the upgrade parameters of the interrupt handling program to be upgraded, and the upgrade parameters include the interrupt number and the code length.

The BMC stores the interrupt handling program to be upgraded in the BIOS Flash according to the upgrade parameters, overwrites the historical interrupt handling program corresponding to the interrupt handling program to be upgraded in the BIOS Flash, and sends the upgrade interrupt signal to the interrupt handler.

The interrupt handler responds to the upgrade interrupt signal and starts the interrupt upgrade program. The interrupt upgrade program acquires the upgrade parameters of the interrupt handling program to be upgraded, moves the interrupt handling program to be upgraded in the BIOS Flash to the physical memory address according to the upgrade parameters, and overwrites the historical interrupt handling program corresponding to the interrupt handling program to be upgraded in the physical memory address to be regarded as the new interrupt handling program.

The various embodiments in this specification are described in a progressive manner, with each embodiment emphasizing its differences from other embodiments. The same and similar parts between the embodiments may be referred to each other.

Persons skilled in the art should understand that the embodiments of the present application may be provided as methods, devices, or computer program products. Therefore, the embodiments of the present application may take the form of fully hardware embodiments, fully software embodiments, or embodiments combining software and hardware aspects. Moreover, the embodiments of the present application may take the form of a computer program product implemented on one or more computer usable storage media (including but not limited to disk storage, CD-ROM (Compact Disc Read Only Memory), optical storage, etc.) containing computer usable program code.

The embodiments of the present application are described with reference to the flowchart and/or block diagram of the method, terminal device (system), and computer program product according to the embodiments of the present application. It should be understood that each process and/or block in the flowchart and/or block diagram, as well as the combination of processes and/or blocks in the flowchart and/or block diagram, may be implemented by computer program instructions. These computer program instructions may be provided to a processor of a general-purpose computer, specialized computer, embedded processor, or other programmable data processing terminal device to generate a machine, such that the instructions executed by the processor of the computer or other programmable data processing terminal device generate a device for implementing the functions specified in one or more processes in the flowchart and/or one or more boxes in the block diagram.

These computer program instructions may also be stored in computer-readable memory that may guide a computer or other programmable data processing terminal device to operate in a specific manner, such that the instructions stored in the computer-readable memory generate a manufactured product including instruction devices that implement the functions specified in a flowchart or multiple flowcharts and/or a block diagram or multiple boxes.

These computer program instructions may also be loaded onto a computer or other programmable data processing terminal device, enabling a series of operational steps to be executed on the computer or other programmable terminal device to generate computer implemented processing. The instructions executed on the computer or other programmable terminal device provide steps for implementing the functions specified in one or more processes in the flowchart and/or one or more boxes in the block diagram.

Although preferred embodiments of the present application have been described, those skilled in the art may make additional changes and modifications to these embodiments once they have knowledge of the basic inventive concept. Therefore, the attached claims are intended to be interpreted as including preferred embodiments and all changes and modifications falling within the scope of the embodiments of the present application.

Finally, it should be noted that in this specification, relational terms such as first and second are only used to distinguish one entity or operation from another, and do not necessarily require or imply any actual relationship or order between these entities or operations. Moreover, the terms "including/comprising", "containing", or any other variation thereof are intended to encompass non-exclusive inclusion, such that a process, method, article, or terminal device that includes a series of elements not only includes those elements, but also includes other elements not explicitly listed, or also includes elements inherent to such process, method, article, or terminal device. Without further limitations, the element limited by the statement "including one . . . " does not exclude the existence of other identical elements in the process, method, item, or terminal device that includes the element.

This specification uses specific examples to explain the principles and implementation methods of the present application. The above examples are only used to help understand the methods and core ideas of the present application. Meanwhile, for those skilled in the art, there may be changes in the specific implementation and application scope based on the ideas of the present application. Therefore, the content of this specification should not be understood as limiting the present application.

The invention claimed is:

1. A method, comprising:

responding, using a baseboard management controller (BMC), to an upgrade operation by acquiring an interrupt handling program and upgrade parameters of the interrupt handling program, wherein the upgrade parameters comprise an interrupt number and a code length, and the interrupt number of the interrupt handling program is the same as an interrupt number of a historical interrupt handling program;

by the BMC, storing the interrupt handling program in a basic input output system (BIOS) flash memory according to the upgrade parameters, thereby overwriting a copy of the historical interrupt handling program in the BIOS flash memory, and sending an upgrade interrupt signal to an interrupt handler;

responding, using the interrupt handler, to the upgrade interrupt signal by starting an interrupt upgrade program; and by the interrupt upgrade program, acquiring the upgrade parameters, determining a storage location of the interrupt handling program in the BIOS flash memory according to the interrupt number, and reading the interrupt handling program according to the code length; and by the interrupt upgrade program, determining a location in the physical memory address where the historical interrupt handling program is stored according to the interrupt number, and overwriting a copy of the historical interrupt handling program in the physical memory address with the interrupt handling program.

2. The method according to claim 1, further comprising, after responding to the upgrade operation:

starting, by the BMC, a BMC upgrade program stored in the BMC;

wherein storing, by the BMC, the interrupt handling program to be upgraded in the basic input output system (BIOS) flash memory according to the upgrade parameters, overwriting the historical interrupt handling program, and sending the upgrade interrupt signal to the interrupt handler comprises:

storing, by the BMC upgrade program, the interrupt handling program in the BIOS flash memory according to the upgrade parameters, and overwriting the historical interrupt handling program; and sending, by the BMC upgrade program, the upgrade interrupt signal to the interrupt handler, wherein the upgrade interrupt signal carries the interrupt number corresponding to the interrupt upgrade program.

3. The method according to claim 2, wherein storing, by the BMC upgrade program, the interrupt handling program in the BIOS flash memory according to the upgrade parameters, and overwriting the historical interrupt handling program in the BIOS flash memory comprises:

reading, by the BMC upgrade program, the interrupt handling program stored in the BMC according to the code length in the upgrade parameters; and determining, by the BMC upgrade program, a target storage location in the BIOS flash memory corresponding to the interrupt handling program according to the interrupt number in the upgrade parameters, storing the interrupt handling program at the corresponding target storage location in the BIOS flash memory, and overwriting the historical interrupt handling program stored at the target storage location with the interrupt handling program.

4. The method according to claim 2, wherein responding, using the interrupt handler, to the upgrade interrupt signal by starting an interrupt upgrade program comprises:

acquiring, by the interrupt handler, the interrupt upgrade program from the physical memory address and starting the interrupt upgrade program according to the interrupt number corresponding to the interrupt upgrade program carried in the upgrade interrupt signal.

5. The method according to claim 1, further comprising:

sending, by the BMC, the upgrade parameters of the interrupt handling program to a central processing unit (CPU) register for storage through a data transmission channel with a CPU.

6. The method according to claim 5, wherein by the interrupt upgrade program, acquiring the upgrade parameters comprises:

reading, by the interrupt upgrade program, the CPU register, and acquiring the upgrade parameters of the interrupt handling program.

7. The method according to claim 5, wherein sending, by the BMC, the upgrade parameters of the interrupt handling program to the central processing unit (CPU) register for storage through the data transmission channel with the CPU comprises:

sending, by the BMC, the upgrade parameters of the interrupt handling program to CPU register for storage through a platform environment control interface (PECI) channel of an Intel platform.

8. The method according to claim 5, wherein sending, by the BMC, the upgrade parameters of the interrupt handling program to the central processing unit (CPU) register for storage through the data transmission channel with the CPU comprises:

sending, by the BMC, the upgrade parameters of the interrupt handling program to CPU register for storage through a universal standard peripheral component interconnect express (PCIe) channel.

9. The method according to claim 1, wherein acquiring the interrupt handling program and the upgrade parameters of the interrupt handling program comprises:

when the upgrade parameters of the interrupt handling program are stored in a file header of the interrupt handling program, acquiring, by the BMC, the file header of a file of the interrupt handling program, and parsing to obtain the upgrade parameters of the interrupt handling program.

10. The method according to claim 9, wherein by the interrupt upgrade program, acquiring the upgrade parameters comprises:

identifying, by the interrupt upgrade program, the file header of the interrupt handling program in the BIOS flash memory, and parsing to obtain the upgrade parameters of the interrupt handling program.

11. The method according to claim 10, wherein after identifying, by the interrupt upgrade program, the file header of the interrupt handling program in the BIOS flash memory, and parsing to obtain the upgrade parameters of the interrupt handling program, the method further comprises:

erasing, by the interrupt upgrade program, the file header of the interrupt handling program.

12. The method according to claim 10, further comprising:

when the BMC responds to the upgrade operation for the interrupt handling program, detecting whether the interrupt handling program comprises the file header; and when the interrupt handling program comprises the file header, carrying an upgrade identification for the file header;

wherein identifying, by the interrupt upgrade program, the file header of the interrupt handling program in the BIOS flash memory, and parsing to obtain the upgrade parameters of the interrupt handling program comprises:

searching, by the interrupt upgrade program, for the upgrade identification, determining the file header of the interrupt handling program corresponding to the upgrade identification, and parsing to obtain the upgrade parameters of the interrupt handling program.

13. The method according to claim 12, wherein when the interrupt handling program comprises the file header, carrying the upgrade identification for the file header comprises:

performing a hash calculation on the upgrade parameters of the interrupt handling program, and adding a calculated hash value of the upgrade parameters as the upgrade identification to the file header of the interrupt handling program.

14. The method according to claim 1, further comprising:

configuring the upgrade interrupt signal corresponding to the interrupt upgrade program as the highest priority.

15. The method according to claim 1, wherein after responding, using the baseboard management controller (BMC), to the upgrade operation by acquiring the interrupt handling program and the upgrade parameters of the interrupt handling program, the method further comprises:

when the BMC receives a plurality of different interrupt handling programs, assigning upgrade priorities to the plurality of different interrupt handling programs according to interrupt types of the plurality of different interrupt handling programs;

wherein responding, using the interrupt handler, to the upgrade interrupt signal by starting the interrupt upgrade program comprises:

upgrading, by the interrupt upgrade program, the plurality of different interrupt handling programs in order of priority.

16. The method according to claim 1, wherein after overwriting the historical interrupt handling program in the physical memory address with the interrupt handling program, the method further comprises:

when the interrupt handler monitors an interrupt signal corresponding to the new interrupt handling program, executing the new interrupt handling program.

17. The method according to claim 1, further comprising:

generating an upgrade completion prompt after regarding the interrupt handling program as the new interrupt handling program.

18. The method according to claim 1, further comprising:

monitoring an upgrade process of the interrupt handling program, and generating an upgrade failed prompt when upgrade of the interrupt handling program fails.

19. The method according to claim 1, further comprising:

providing, by the BMC, a communication interface for users to upload the interrupt handling program, to perform the upgrade operation.

20. A computer system, wherein the computer system comprises the BMC, the BIOS flash memory, the interrupt handler and the physical memory address, the computer is used to execute the method according to claim 1.

* * * * *